Feb. 4, 1958 R. P. CARROLL 2,822,531
PROGRAMMING CONTROL SYSTEM
Filed Jan. 26, 1954 7 Sheets-Sheet 2
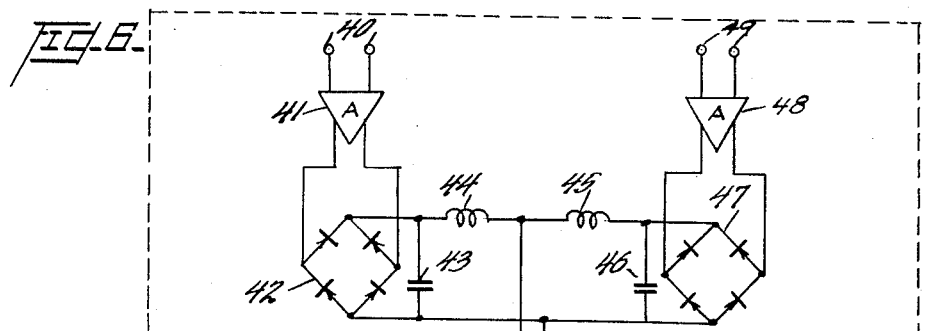
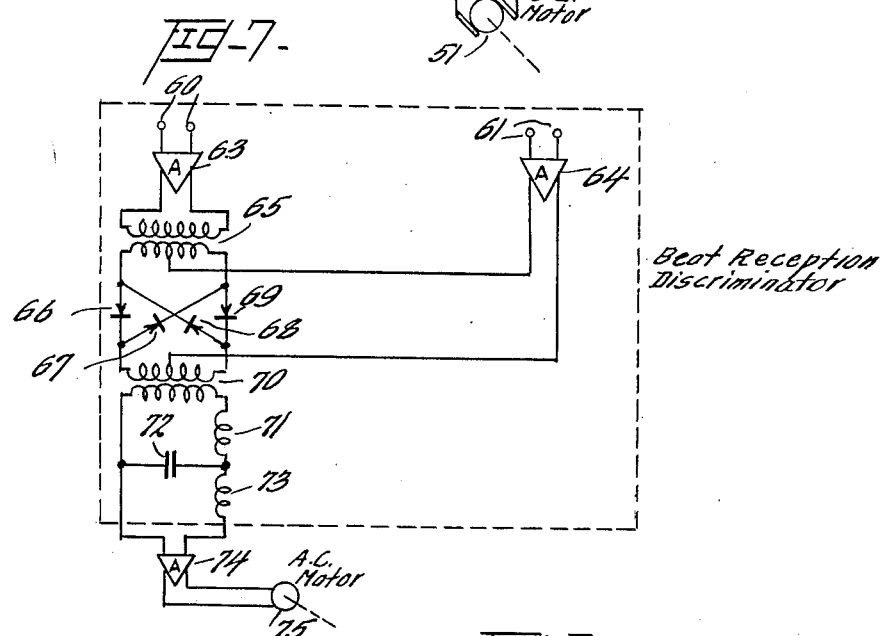
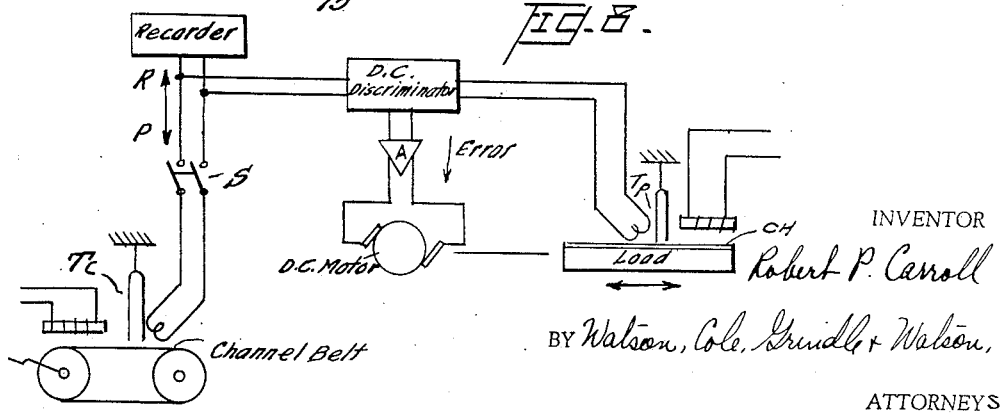
INVENTOR
Robert P. Carroll
BY Watson, Cole, Grindle & Watson,
ATTORNEYS Feb. 4, 1958 R. P. CARROLL 2,822,531
PROGRAMMING CONTROL SYSTEM
Filed Jan. 26, 1954 7 Sheets-Sheet 3
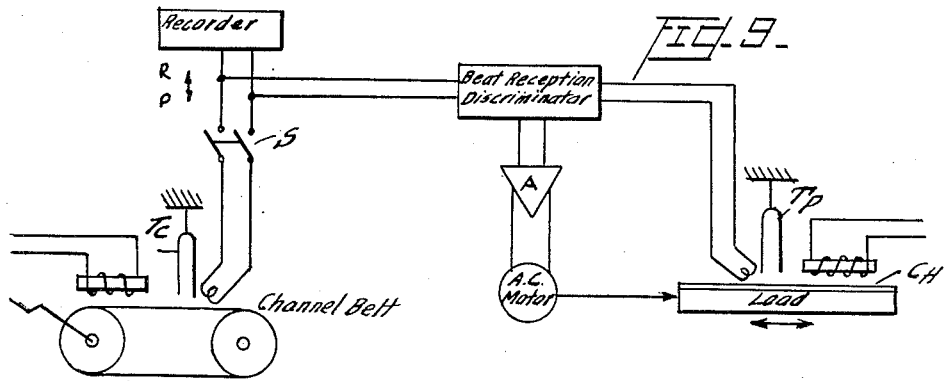
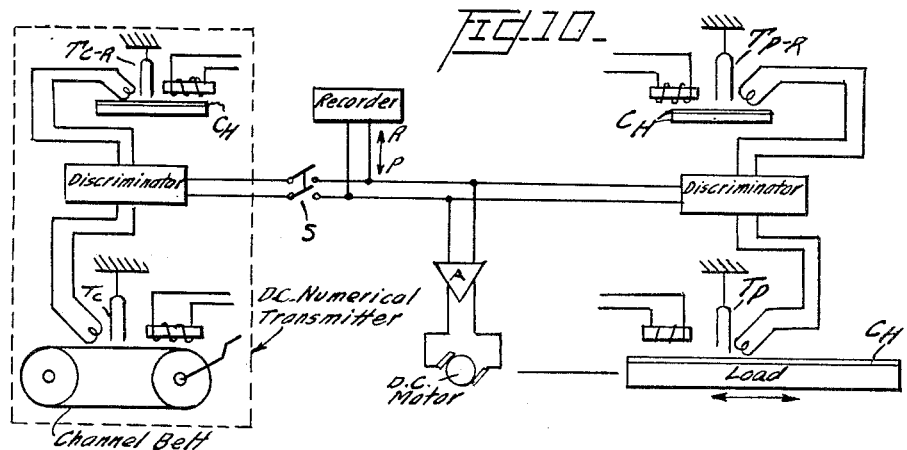
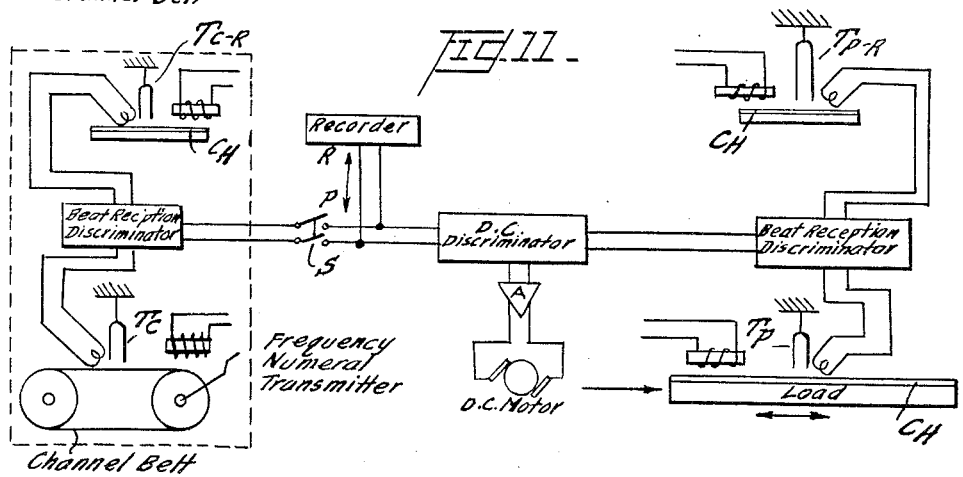
INVENTOR
Robert P. Carroll
BY
Watson, Cole, Grindle, Watson, ATTORNEYS

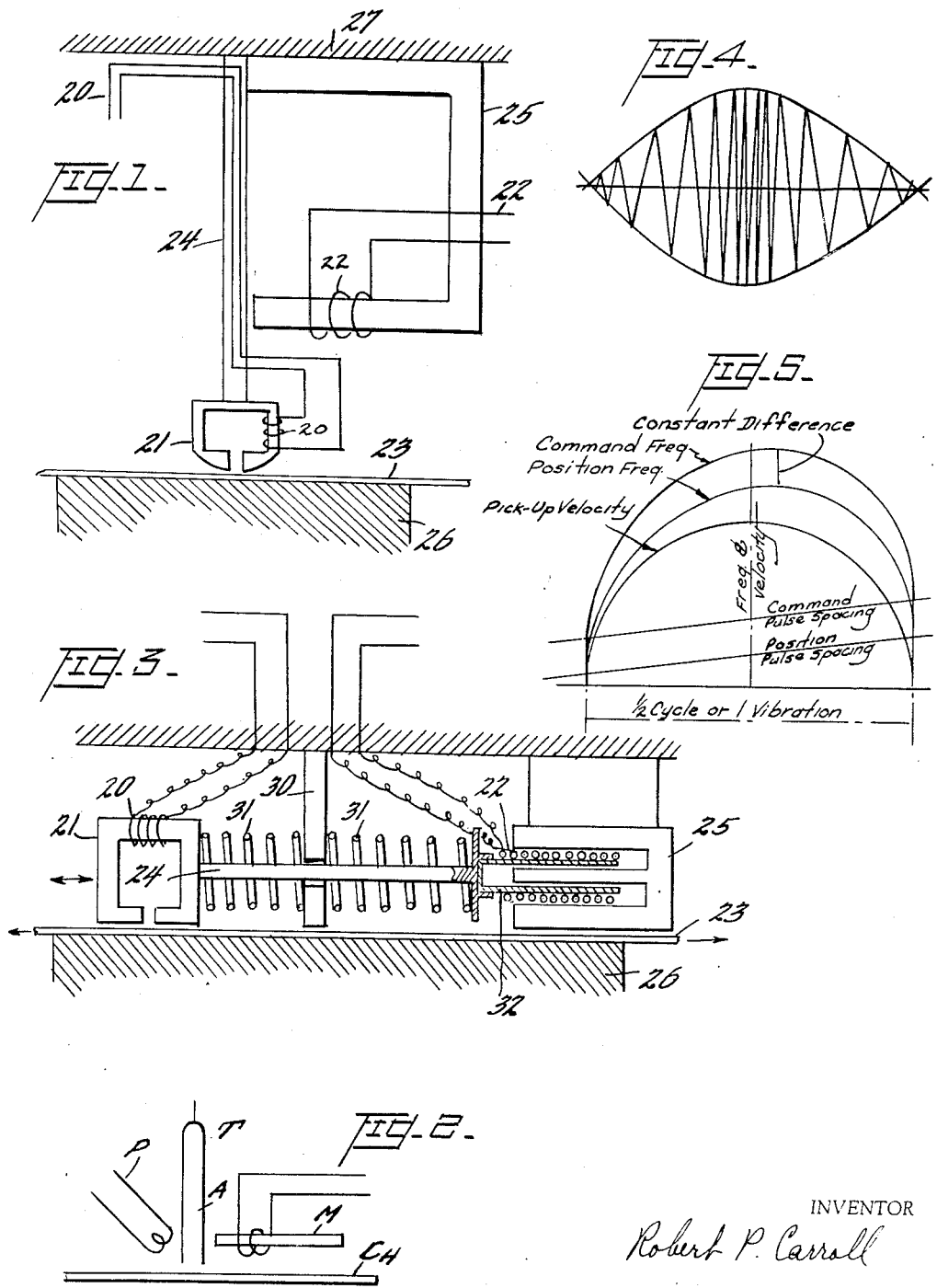

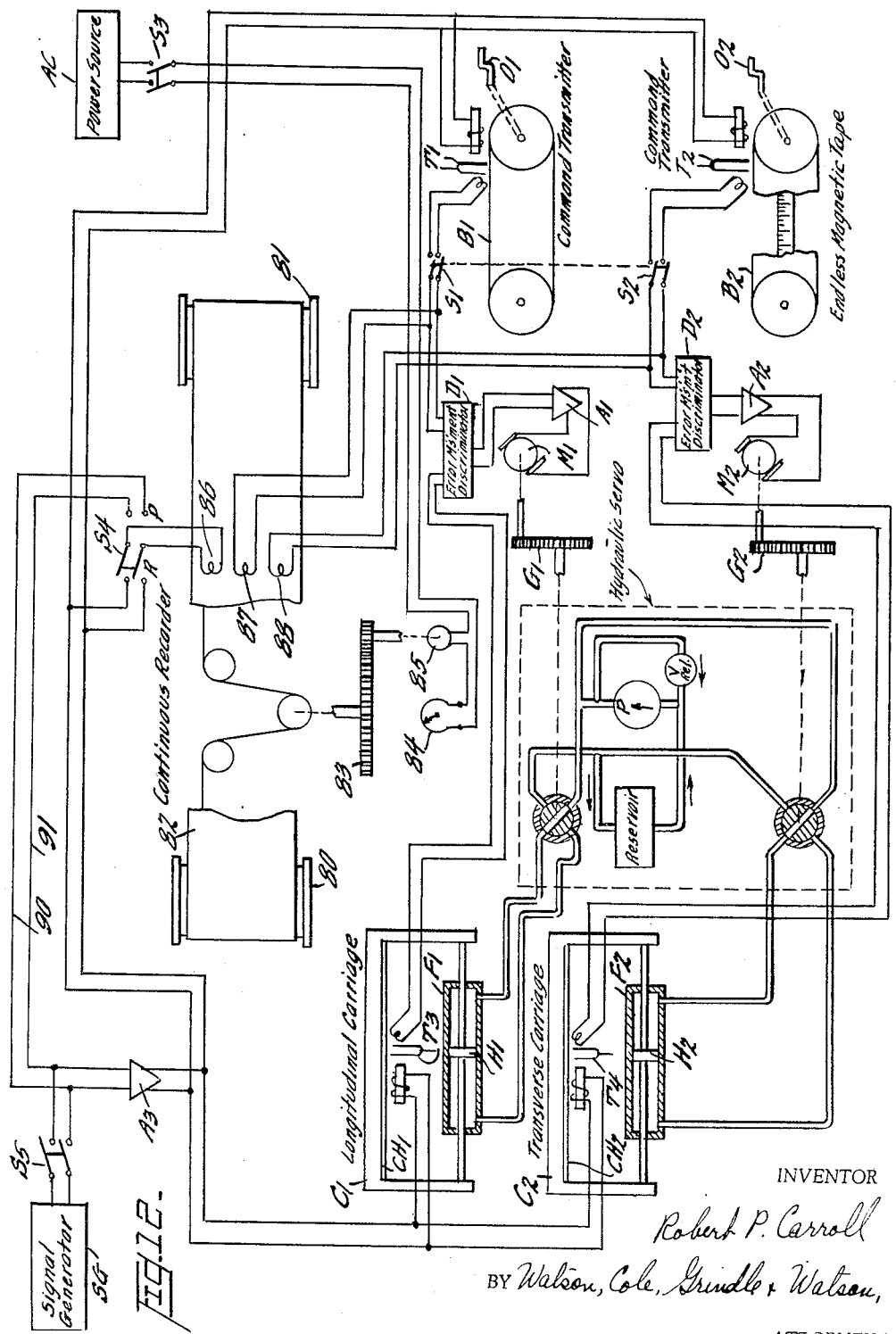

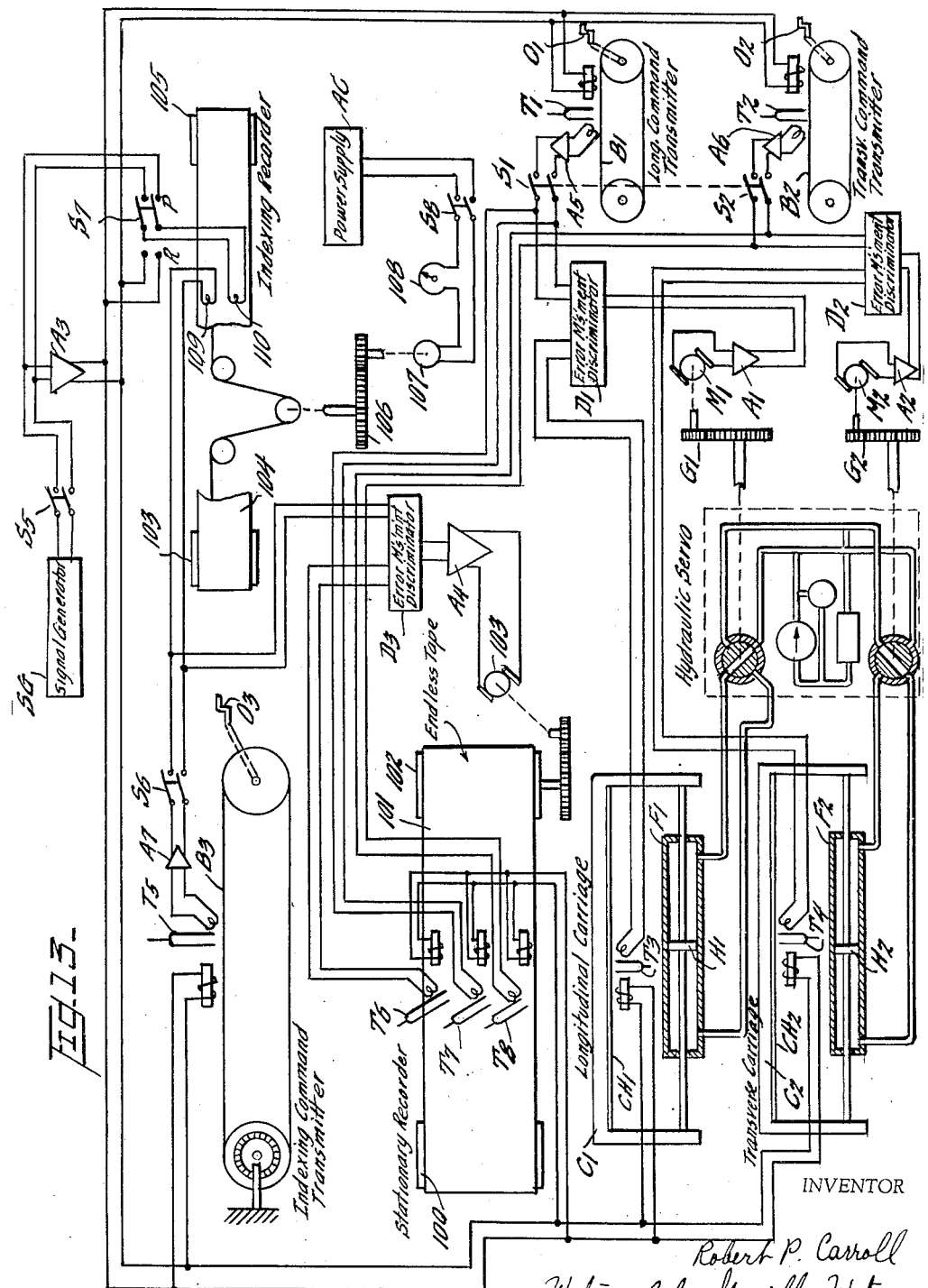

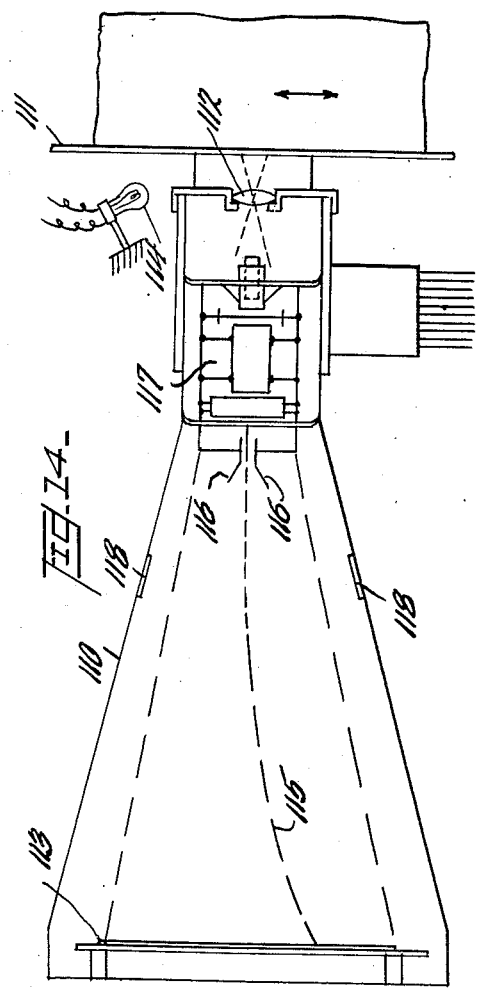
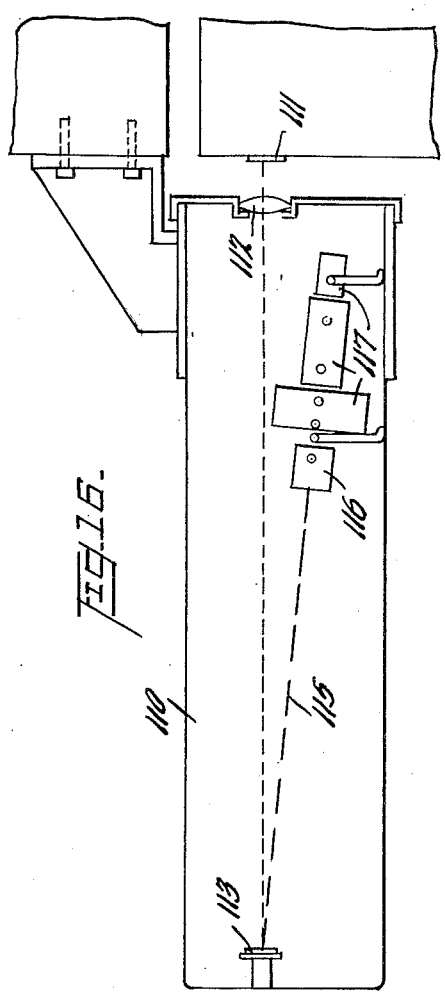
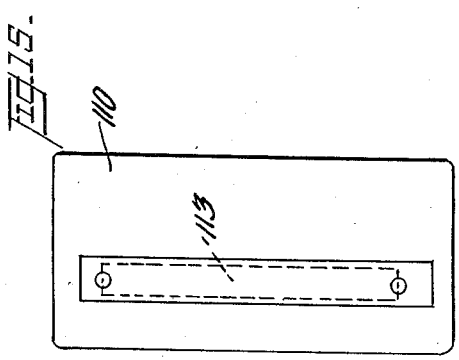

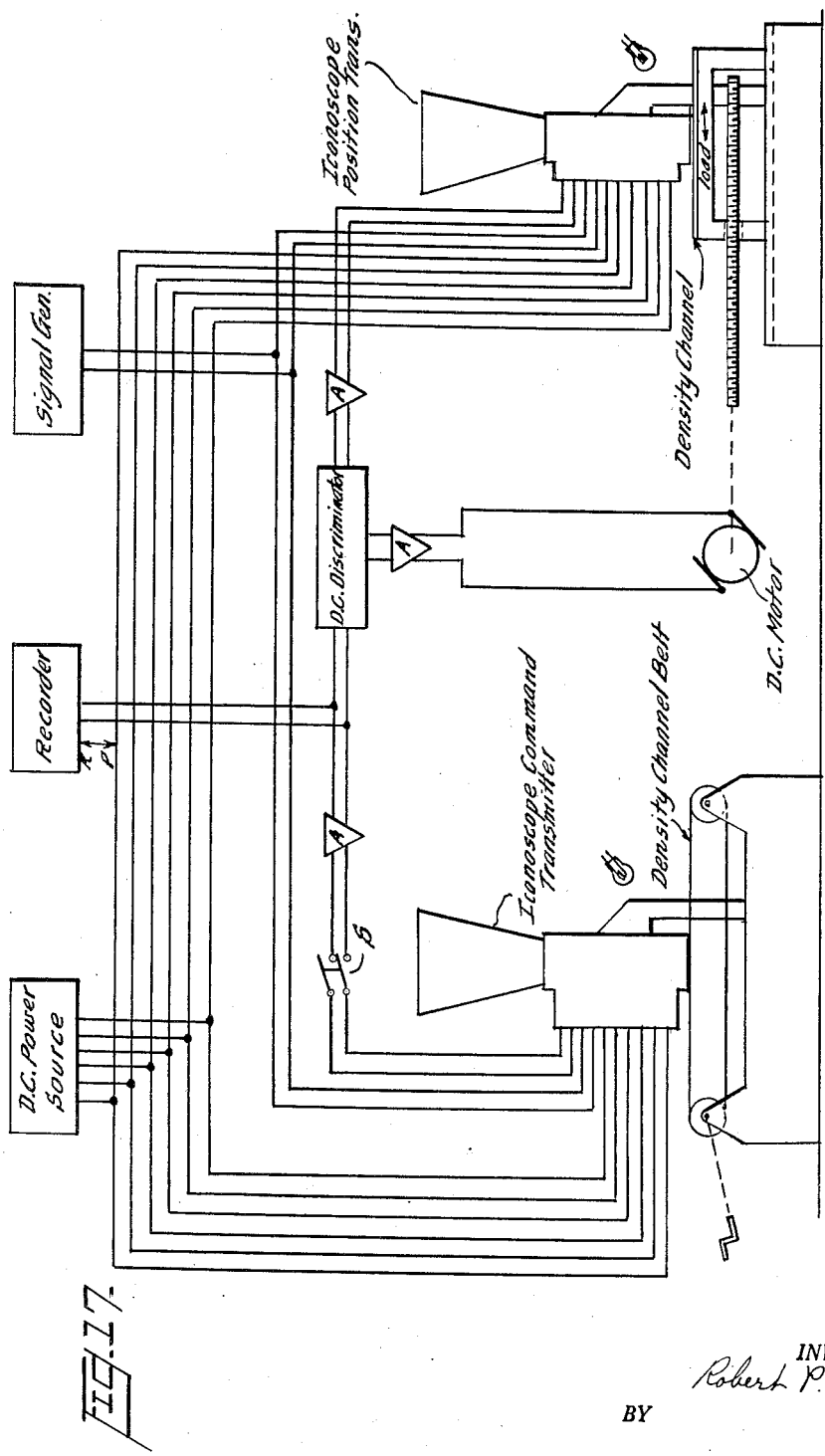

United States Patent Office 2,822,531
Patented Feb. 4, 1958

2,822,531
PROGRAMMING CONTROL SYSTEM

Robert P. Carroll, Chicago, Ill.

Application January 26, 1954, Serial No. 406,219

8 Claims. (Cl. 340—174)

This invention relates to programming servo systems by which a desired program or sequence of operations for a controlled or slave mechanism is produced by remotely located command mechanism.

In many of the present programming systems, motion and position are mechanically defined or measured in one of the several common geometrical coordinate systems for defining a point in space. This mechanical measurement is transformed into an electrical signal by self-synchronous generators, recorded, and then the original motion or position is reproduced by servo action by the playback of the recording. Servo action is made possible by the fact that the phase displacement of the signal of the generators is proportional to the mechanical displacement. This means that these systems are basically systems for counting revolutions and degrees with the following disadvantages: (1) They must start from an arbitrary zero to synchronize recorded revolutions and machine revolutions during playback, (2) when stopped in the middle of a program, re-synchronization is difficult without returning to zero, (3) adjustment or correction of the difference between mechanical and electrical synchronization requires mechanical or electrical differential means which add to the complexity and inaccuracy.

The novel programming systems herein described are based upon direct frequency modulation of an electrical signal and have as a principal object the provision of a method and apparatus by which the controlled mechanism proceeds directly to its commanded position without first having to start or return to an arbitrary zero or reference point. This mode of operation is advantageous because it permits a tape having recorded command signals to be stopped, adjusted, backed up, or started at any point without breaking the control.

In a first mode of operation, the frequency-modulated electrical signals which provide the basis of the novel systems herein are generated by a transmitter having an oscillating head which is associated with a magnetic channel. A sinusoidal signal is recorded on the channel which varies uniformly in frequency over the channel length.

In a second mode of operation, the basic frequency-modulated electrical signals are generated by a transmitter having an iconoscope head which is associated with a sinusoidal black and white density channel. The frequency of this channel also varies uniformly in frequency over the channel length.

By moving the oscillating or the iconoscope head relative to an associated channel, an output electrical signal is generated which uniquely defines the relative position of the head with respect to the associated channel. This signal is compared in a discriminator with a corresponding signal generated by a second transmitter head and its associated channel. This comparison process produces an output error signal which is a measure of the direction and magnitude of the difference in the positions of the two transmitters relative to their associated channels.

Many diversified programming arrangements are obtainable by utilizing the above transmitters for three basic purposes which are classified according to use, that is, command, position, and reference functions. Command transmitters generate command signals which are converted by a servo system into the desired slave motion or positioning, position transmitters generate a signal which indicates the exact position of a controlled or slave element, and reference transmitters generate a constant reference signal which defines the fixed position of a transmitter head with respect to its associated channel.

In a particular programming application employing transmitters having oscillating heads, a first channel is mechanically coupled to a slave or controlled element, and an associated position transmitter head is made to oscillate about a stationary support. A second transmitter head oscillates about a stationary support and a second or command channel is moved relative thereto in accordance with a desired program of events. The output of the two transmitters is connected to a discriminator which produces an error signal whenever the load and its associated channel generates a signal in the first transmitter which does not correspond in characteristics to that generated by the second or command transmitter. This error output signal is applied to a conventional motor which drives the load to the commanded position.

When iconoscope transmitters are used in the above system, density channels are moved relative to the iconoscope lenses with the resulting images being scanned by electron beams to produce frequency-modulated signals which are compared in a discriminator. Any error output signal energizes the motor which drives the load to the commanded position.

In order that all of the objects and features of this invention may be readily understood, reference is herein made to the accompanying drawings wherein:

Figure 1 is a diagrammatic representation of a first embodiment of an oscillating transmitter;

Figure 2 is a schematic symbol used throughout the drawings to show the major components of an oscillating transmitter and its associated channel;

Figure 3 is a diagrammatic representation of a second embodiment of an oscillating transmitter which employs a reciprocating linear oscillation;

Figure 4 is a graphical representation of the electrical signal generated by a one-half cycle oscillation of a transmitter;

Figure 5 is a diagram of assistance in analyzing the characteristics of an oscillating transmitter and its associated channel;

Figure 6 is a diagram of an error-measurement circuit using a direct-current discriminator;

Figure 7 is a diagram of an error-measurement circuit using a beat-reception discriminator;

Figure 8 is a servo programming system using a direct-current discriminator;

Figure 9 is a servo programming system using a beat-reception discriminator;

Figure 10 is a servo programming system using a direct-current numerical transmitter;

Figure 11 is a servo programming system using a frequency numerical transmitter;

Figure 12 is a position and motion programming servo system having a continuous recording feature;

Figure 13 is a position programming servo system having a stationary recording feature;

Figure 14 is a diagrammatic representation of an iconoscope transmitter;

Figure 15 is a simplified end view of the transmitter shown in Figure 14;

Figure 16 is a plan view of the transmitter shown in Figure 14; and

Figure 17 is a servo programming system using iconoscope transmitters.

A diagrammatic representation of a basic oscillating transmitter for use in the programming systems of this invention is shown in Figure 1. The transmitter comprises two major components, a magnetic recording channel 23 positioned upon channel support 26, and an oscillating magnetic pickup head comprising pickup winding 20 coupled to magnetic pickup core 21. Pickup core 21 is supported from transmitter support 27 by movable armature 24. Armature 24 is constructed of magnetic material and together with magnetic motor core 25 forms a path for the magnetic flux created by the energization of motor winding 22.

Channel 23 is constructed of magnetic material which is so processed that a sinusoidal electrical signal is recorded thereon which varies uniformly over the channel length in a range of, for example, 200 cycles per second to 10,000 cylces per second. The oscillating pickup head travels in a path parallel to the channel, with the head of the pickup touching the channel slightly or being separated therefrom by a relatively small gap.

When motor winding 22 is energized by an alternating current, armature 24 oscillates thereby inducing a potential in pickup winding 20 which is dependent upon the frequency and amplitude of the armature oscillations, and the magnetic impression of the portion of channel 23 located immediately below the gap in pickup core 21.

In the actual operation of certain of the programming systems of this invention, the entire transmitter structure is moved relative to the channel. In these applications, the length of the channel is the distance through which a slave mechanism is controlled by an appropriate servo system. Although the relative path of the transmitter and the channel can be of any configuration such as a circle or spiral, for simplicity, the illustrations herein shown relate to travel in a straight line.

Figure 2 is a schematic representation used throughout the specification for the basic transmitter and associated channel shown in Figure 1 and for any corresponding equivalent embodiments thereof. The symbol for the transmitter T includes the oscillating armature A and a pickup winding P. Motor means M generally signifies the structure utilized to oscillate the armature relative to magnetic channel CH thereby producing the requisite oscillatory motion for pickup winding P.

Figure 3 shows an alternative embodiment for the transmitter of Figure 1. This alternative embodiment is particularly characterized by a structure which incorporates a linear motor to produce reciprocating oscillations for pickup winding 20 and its associated pickup core 21. Pickup core 21 is coupled to armature sleeve 32 by means of armature 24. Armature springs 31 support armature 24 relative to armature support 30. The energization of motor winding 22 located upon armature sleeve 32 produces a reciprocating linear motion in armature 24 which creates the requisite oscillation for pickup winding 20 and its associated core 21. It is essential to the proper operation of Figure 3 that the natural frequency of springs 31 exceed that of the oscillation frequency range for the pickup head.

As previously noted, the oscillation of the pickup head relative to a particular section of the magnetic channel generates a signal in the pickup winding. This signal is characterized by the fact that it uniquely defines the particular section of the channel magnetically coupled to the pickup head. A small movement of the transmitter relative to the magnetic channel will generate a responsive alternating-current signal either higher or lower in average frequency which also uniquely defines the new relative position of the transmitter with respect to the magnetic channel.

The waveform of the alternating-current signal generated by the basic oscillating transmitter herein is due to the variation in the magnetic pulse spacing of the channel, and also to the variations of the relative velocity between the transmitter head and the channel. The number of lines of force issuing from the magnetic channel gradually and uniformly increases from the low frequency to the high frequency end of the channel. Relative movement in this direction produces a gradual increase in the average voltage generated by the pickup winding. The variation of the relative velocity between the transmitter and the channel arises from two sources, namely, the oscillation of the transmitter head and the external adjustment of the channel in response to a desired programming motion. Inasmuch as the adjustment motion of the channel is relatively slow compared to the motion of the transmitter head created by the oscillating motor, it may be assumed initially for purposes of analysis that the channel motion does not appreciably affect the amplitude and frequency of the output voltage generated by the transmitter pickup winding.

The relative motion of the transmitter head and the associated magnetic channel during one oscillation cycle of the transmitter head is such that the frequency and average voltage start at zero at one end of the oscillation arc, rise to a maximum near the center of the arc, and return to zero again at the opposite end of the oscillation arc. The changes in output signal characteristics created by a single oscillation arc of the transmitter head are graphically shown in Figure 4. The sequence is repeated in reverse order in the return or last half of the oscillation cycle.

As will be seen from the graphical representation of the output signal of the transmitter, two basic types of modulation are created by the transmitter. First, there is a constant modulation of both the amplitude and frequency of the carrier signal of the channel due to the oscillation of the transmitter head. Secondly, there is a modulation of the carrier signal due to the adjustment of the position of the transmitter relative to its associated magnetic channel. As will be explained hereinafter in connection with the particular programming systems of this invention, the modulation caused by the oscillation of the transmitter head is cancelled out by specified discriminator action thereby leaving the modulation created by the adjustment of the channel relative to the transmitter as the effective modulation. It will be noted that the modulation produced by channel motion is an absolute or numerical modulation. This type of modulation will hereinafter be referred to as numerical frequency modulation or NFM.

The graphical representation of Figure 5 shows the effect of the simple harmonic motion of the transmitter head upon the output signal of the transmitter. The ordinate axis for the curves represents both average voltage and frequency of the transmitter output signal. The voltage generated by the transmitter is proportional to the frequency reproduced from an associated channel.

The curves shown are applicable to transmitters utilized for both command and position functions. Assuming for the purposes of explanatory discussion that the following characteristics are applicable for transmitters utilized as command and position transmitters: (1) Oscillation arc amplitudes and instantaneous head velocities are the same. (2) The instantaneous directions of motion of the heads relative to the channels are the same. That is, they both increase frequency and decrease frequency on their respective channels at the same time. (3) The strength, length and frequency range of the channels are the same. (4) And that both transmitters are held stationary at dissimilar spots on their channels while the heads oscillate normally. Then, the difference in frequency and voltage between the two transmitters is constant throughout an oscillation cycle. This is noted by the vertical line of constant difference in Figure 5. This constant difference is to be expected because at any instant the heads of both command and position transmitters are travelling at the same velocity. This constant difference also represents the difference between the two carrier signals resulting from the dissimilar locations of the transmitter heads with respect to their associated channels.

For purposes of analysis of the servo systems of this invention, the transmitters are characterized and classified according to three basic types of use, that is, command transmitters, position transmitters, and reference transmitters.

Command transmitters generate the command signals which the servo systems herein convert into a desired motion which properly positions a controlled structure. In the application of a command transmitter to a servo system herein, means is required for adjusting the position of the supporting frame for the transmitter relative to the associated magnetic channel. In certain applications, the magnetic channel for the command transmitter is recorded on an endless steel tape while the supporting frame for the transmitter remains stationary. The position of the channel relative to the transmitter may be controlled by conventional means such as a hand crank. The steel tape for the transmitter channel may also be indexed or graduated in a manner such as a surveyor's tape thereby providing a visual numbering or indexing system.

Position transmitters are used herein for generating a signal which indicates the exact position of the controlled or slave-driven element. This is accomplished by locating one of the two major parts of the programming signal sources, either the pickup head or the channel, on the controlled element and the other part upon the frame of a processing machine. In the illustrative servo systems hereinafter referred to in the drawings, the channels are shown as being positioned directly upon certain machine carriages while the supporting frame of the transmitter is shown as fixed to the frame of the machine. In other applications, this arrangement may be advantageously reversed.

Reference transmitters are used to generate a constant reference signal which is generated in situations where the relative positions of the channel and the associated transmitter head are fixed except for the transmitter oscillatory motion.

In all three transmitter situations classified according to use, the variation rate of frequency per unit length of channel is identical. In the case of reference transmitters, the channels are only slightly longer than the arc of oscillation of the transmitted head while the frequency range of this channel is higher or lower than the highest or lowest frequencies of the command and position transmitter channels utilized in a particular servo system.

A fourth type of transmitter classification according to use is herein characterized as the D. C. numerical transmitter. This transmitter comprises a command transmitter, reference transmitter and a discriminator. As will be explained hereinafter, the association of these three principal components produces a D. C. current proportional to the position of the oscillating head of the command transmitter relative to its associated channel.

A fifth type of transmitter classified according to use is herein characterized as the numerical frequency transmitter. This transmitter comprises a command transmitter, position transmitter, and a beat frequency receiver. As will be explained hereinafter, this particular combination produces an alternating-current electrical signal having a frequency which is proportional to the position of the oscillating head for the command transmitter relative to its associated channel.

The constant difference in voltage and frequency created by a change in the transmitter position relative to its associated magnetic channel provides a means for measuring the physical difference in the positioning of two transmitters with respect to their associated channels. A discriminator such as that shown in simplified form in Figure 6 and which is also generally typical of discriminators used in frequency modulation radio, produces an output error signal which is amplified to produce a desired servo output action in circumstances wherein the control or slave mechanism is improperly positioned with respect to the commanded position.

In the discriminator of Figure 6, the output leads for the pickup winding of a command transmitter are connected to input terminals 40. Preamplifier 41 amplifies the transmitter signal and applies it to full wave bridge rectifier 42. After rectification, the signal is transmitted to the network comprising capacitor 43 and inductor 44. The output leads for the pickup winding of a position transmitter are applied to terminals 49. Preamplifier 48 amplifies the transmitter signal and applies it to full wave bridge rectifier 47. The resulting rectified signal is applied to the network comprising capacitor 46 and inductor 45. Amplifier 50 applies a direct-current discriminator voltage to direct-current motor 51. The error signal applied to the input of amplifier 50 is a direct-current signal whose polarity and amplitude is a measure of the direction and magnitude of the relative difference in the positions of the control and position transmitters. In operative situations herein when the position transmitter is properly located with respect to the commanded position signalled by the command transmitter, the error signal applied to the input of amplifier 50 is zero inasmuch as the discriminator voltage created by both transmitters oppose each other. The action of the discriminator with respect to the operation of both the control and position transmitters might be described as continuous numerical subtraction of the lines of magnetic flux issuing from the channels of the command and position transmitters due to their dissimilar positions.

An alternate error-measurement structure is shown in Figure 7. This structure is herein characterized as a beat-reception discriminator as distinguished from the direction-current discriminator of Figure 6. This difference in terminology is suitable inasmuch as the beat-reception discriminator applies an alternating-current potential to an output alternating-current motor, whereas, the direct current discriminator applies an output direct-current potential to a direct-current output motor.

In the beat-reception discriminator of Figure 7, the output leads of the pick-up winding for a command transmitter are connected to input terminals 60. The applied signal is amplified by means of preamplifier 63 and applied to the primary winding of transformer 65. The secondary winding of transformer 65 is connected to the primary winding of transformer 70 through rectifiers 66 and 69. Rectifier 67 connects the negative pole of rectifier 66 to the positive pole of rectifier 69. Rectifier 68 connects the positive pole of rectifier 66 to the negative pole of rectifier 69. The output terminals of preamplifier 64 are connected to center tap terminals for the secondary winding of transformer 65 and the primary winding of transformer 70. Input terminals 61 of preamplifier 64 connect to the output leads for the pickup winding of a position transmitter. The beat-reception discriminator produces an alternating-current error signal by means of beat-reception in which both the frequency and voltage is the measure of the magnitude of the error signal generated by the signal transmitter. The particular direction of error is indicated by the phase of the signal. A T section filter comprising inductor 71, capacitor 72 and inductor 73 eliminates the $(f_c+f_p)$ frequency produced by the beating process.

Figure 8 illustrates in simplified form a first embodiment of the various servo control systems of this invention which use the discriminator or error measurement arrangements previously described. Command transmitter $T_c$ is associated with an endless magnetic channel belt which is movable by means of the hand control arm. Position transmitter $T_p$ is associated with a load whose relative position is to be controlled. The load has a magnetic channel CH coupled thereto which corresponds, in part at least, to the frequency range of the channel belt. The output leads for the pickup windings of both the command transmitter and the position transmitter are connected to a direct-current discriminator whose structural detail corresponds to that of the discriminator of Figure 6. The output error signal of the discriminator is connected to the input terminals of amplifier A, and the output of the amplifier is connected to a direct-current motor. The direct-current motor is mechanically coupled to the load in such a manner that the load may be moved relative to the position transmitter. When switch S is closed and the channel belt is moved by operation of the hand control, the direct-current motor will drive the load so that the frequency of the magnetic channel segment immediately below the position transmitter will correspond with the frequency of the magnetic segment immediately below the command transmitter. The servo arrangement of Figure 8 is a closed loop system whose output is null seeking. A recorder is shown which may be used on playback after an appropriate recording of command signals as an alternate source for command signals.

The simplified servo system shown in Figure 9 corresponds generally to the servo system of Figure 8. The system differs, however, in that in lieu of a direct-current discriminator, a beat-reception discriminator is used having a structure which corresponds to that previously described in Figure 7. The command and position signals are converted by the beat-reception discriminator into a difference frequency in the beat receiver. This difference frequency comprises an error signal which is amplified by amplifier A and thereafter used to energize the alternating-current motor.

The servo system shown in Figure 10 utilizes a command-reference transmitter in association with a command transmitter. This combination comprises a direct-current numerical transmitter for producing a command signal. The position transmitter is associated with a position-reference transmitter through a direct-current discriminator. The command and reference signals are separately compared to the signals of the reference transmitters by the direct-current discriminators. The resulting direct-current signals are added in opposition producing an error signal which after amplification energizes a direct-current motor. The comparison of the signal of a reference transmitter to that of a command transmitter or a position transmitter produces a direct-current signal which defines the position of the command and position transmitters or their channels. This operation occurs because the average frequency of the average voltage of the command and position transmitters vary directly with their position on their respective channels, while the average frequency and average voltage of the reference transmitters in constant.

In the servo system shown in Figure 11, the command and position signals of the transmitters are separately compared in beat-reception discriminators with the signals of associated reference transmitters. The resulting alternating-current error signals are then subtracted by the direct-current discriminator and the resulting direct-current error signal is amplified and thereafter utilized to energize a direct-current motor which operates the slave load.

As previously noted, the command transmitter generates a command signal having a frequency which is numerically modulated proportional to the relative position of the transmitter and its associated channel. The desired frequency proportional to the desired location is selected numerically by adjusting the relative positions of the channel belt by a handcrank. The position transmitter generates a signal which defines the exact position of the load, and the discriminator compares the two signals and produces an error signal which defines the physical difference of the head-channel differences of the two transmitters. When the load element has moved to a position in which the relative positions of the two channels are approaching coincidence, then the decreasing error signal will reduce motor action with a complete stoppage at coincidence.

The servo system shown in Figure 12 is characterized by a continuous recording feature which provides for the recording of servo command signals during a recording phase, and the movement of the controlled or slave structures in response to the recorded signals during an operating or play-back phase. One servo control system is used for controlling each slave element, and a separate channel on the recorder is used for recording the command signals for that servo control system. The total number of servo systems is limited only by the physical limitations of the recorder, that is, the number of channels that may be recorded and played back. In the embodiment of Figure 12, two servo control systems are shown, one for each of the two elements to be controlled in the system.

Command transmitter $T_1$ generates command signals for positioning longitudinal carriage $C_1$, and command transmitter $T_2$ generates command signals for positioning transverse carriage $C_2$. Endless channel belt $B_1$ is rotated relative to command transmitter $T_1$ by means of handcrank $O_1$, and endless channel belt $B_2$ is rotated relative to command transmitter $T_2$ by handcrank $O_2$. Ganged switch $S_1$—$S_2$ connects the pickup windings for transmitters $T_1$ and $T_2$ to error-measurement discriminators $D_1$ and $D_2$. The resulting error signals are amplified by amplifiers $A_1$ and $A_2$ and thereafter applied to individually associated motors $M_1$ and $M_2$. Motor $M_1$ operates gear $G_1$ which is connected to a conventional hydraulic servo mechanism, and motor $M_2$ operates gear $G_2$ which is also connected to a conventional hydraulic servo mechanism. The output hydraulic pipes connected to the servo pump operated by gear $G_1$ feed into a hydraulic chamber including stationary frame $F_1$. The application of hydraulic pressures to either the left or the right side of head $H_1$ causes a corresponding movement of longitudinal carriage $C_1$ relative to its associated position transmitter $T_3$. The hydraulic servo system actuated by gear $G_2$ operates in a corresponding manner upon head $H_2$ to cause a relative movement of transverse carriage $C_2$ with respect to frame $F_2$.

The continuous recorder comprises magnetic tape 82 wound upon reels 80 and 81. When switch $S_3$ is closed motor 85 is energized by the alternating-current power source AC. The actuation of gear 83 by motor 85 produces the requisite tape movement. When switch $S_1$—$S_2$ is closed, recording head 87 records the command channel of belt $B_1$, and recording head 88 records the command channel of belt of $B_2$. Signal generator SG applies an alternating-current energizing potential through switch $S_5$ to amplifier $A_3$. The amplifier output signal energizes the motor windings for transmitters $T_1$, $T_2$, $T_3$ and $T_4$. Inasmuch as the motor windings for the four transmitters are energized from a single source, the mechanical movements produced by the transmitter armatures are in phase.

When double-pole, double-throw switch $S_4$ is closed with respect to the record or R terminals, the energizing signal for the motor windings of the transmitters is also recorded upon tape 82 by recording head 86. The signal thus recorded is subsequently utilized to energize the motor windings of the transmitters by closure of switch $S_4$ with respect to the play-back or P terminals. This feature permits synchronization of the energizing signals for the motor windings with respect to the channel signals recorded by recording heads 87 and 88.

The detailed operation of the servo system of Figure 12 during the recording phase is as follows: Switch $S_4$ is closed with respect to the recording or R terminals thereby preparing the continuous recorder for recording action. Switch $S_5$ is closed thereby applying the output of the signal generator SG through amplifier $A_3$ to the motor coils for transmitters $T_1$, $T_2$, $T_3$ and $T_4$ thereby energizing the four transmitters. Switch $S_3$ is closed thereby applying an alternating-current potential from power source AC to motor 85 through rheostat 84. The resulting motor operation rotates gear 83 so that magnetic tape 82 is moved relative to recording heads 86, 87 and 88. With the closure of switch $S_1$—$S_2$, command transmitters $T_1$ and $T_2$ convey to recording heads 87 and 88, respectively, the channel signals of belts $B_1$ and $B_2$ produced by operation of handcranks $O_1$ and $O_2$. Recording head 86 records in synchronism the alternating-current energizing potential for the motor windings of the transmitters. After the requisite rotation of channel belts $B_1$ and $B_2$, a complete record of the movements thereof are recorded upon magnetic tape 82 thereby providing for the subsequent operation of longitudinal carriage $C_1$ and transverse carriage $C_2$ in response to the command signals recorded upon tape 82. This feature of the invention obviates the necessity for continual operation of the command transmitters and their associated channel belts when it is desired to produce programmed motions for longitudinal carriage $C_1$ and transverse carriage $C_2$.

During the play-back or operating phase, the carriage movements are controlled by the command signals recorded upon magnetic tape 82, with the detailed sequence of operations being as follows: Switch $S_4$ is initially closed with respect to the play-back or P terminals. Switches $S_1$—$S_2$ and $S_5$ are opened thereby disconnecting command transmitter $T_1$, command transmitter $T_2$, and signal generator SG from the circuit. Switch $S_3$ is closed starting the continuous recorder with the recording speed being controlled by manual adjustment of rheostat 84. Generally speaking, the recording phase will usually be made at the lowest tape speed which will satisfactorily record the highest frequency signals generated by the transmitters, and during play-back the tape will be run at a faster speed in order to obtain a speeding up of the desired program of events with respect to carriages $C_1$ and $C_2$.

Since, in the play-back phase, recording heads 87 and 88 become generating sources for command signals, it is necessary that the recorded command signals be synchronized with the signals of position transmitters $T_3$ and $T_4$. This synchronization can be accomplished either by synchronizing the recorded command signals to that of signal generator SG, or by adjusting the output of signal generator SG to that of the recorded command signals. In the structural embodiment shown in Figure 12 the latter alternative was chosen. That is, during the recording phase, switch $S_4$ being in the recording or R position, the output of generator SG is recorded on magnetic tape 82 as a reference signal. During the play-back phase, switch $S_5$ is opened and switch $S_4$ is thrown to the play-back or P position, and the reference signal is reproduced by means of head 86 and amplified by amplifier $A_3$ thereby energizing the motor windings for the four transmitters. This accomplishes the synchronization of the command signals with those of the position transmitters during play-back operation. Since all currents are now produced from a record having fixed relationships, the play-back of 82 can be at a faster or slower speed with constant synchronization. Usually, the recording will be made at a slower speed in order to provide for increased accuracy and smoothness, whereas, play-back will be at a higher speed in order to increase production.

The programming control system shown in Figure 13 is in part identical to the control system of Figure 12. In general, the command transmitter connections through associated error-measurement discriminators and hydraulic servo mechanisms to their individual carriage loads are the same. The system components of Figure 13 which are essentially identical in structure and operation to those of Figure 12 have the same identifying reference characters.

The system of Figure 13 differs generally from that of Figure 12 in that a novel system of recording command and stationary-recorder indexing pulses is employed. As will be readily apparent hereinafter, the stationary recorder used in the system of Figure 13 is inherently best suited for the programming of positions. For this reason, this particular system is appropriately designated as a position programming control system; whereas the system shown in Figure 12 being suitable for the programming of both motion and position is appropriately designated a motion and position programming control system.

In the continuous recording system of Figure 12 recording heads 86, 87 and 88 remain stationary and the recording magnetic tape 82 is moved at a constant rate of speed past the recording heads. In the stationary recorder utilized in the embodiment of Figure 13, the magnetic medium is held stationary and the recording heads move relative thereto in a fixed oscillation arc or stroke of reciprocation depending upon the type transmitter structure used. In particular, during a specified control operation, endless magnetic tape 101 is held stationary while transmitters $T_6$, $T_7$ and $T_8$ oscillate due to the energization of their respective motor coils. Transmitters $T_6$, $T_7$ and $T_8$ both record and detect the channel signals of tape 101.

During the recording phase, the sequence of operation is similar to that of the system shown in Figure 12. Switch $S_5$ is initially closed thereby applying the alternating-current output of signal generator SG through amplifier $A_3$ to the motor windings for transmitters $T_1$, $T_2$, $T_3$, $T_4$, $T_5$, $T_6$, $T_7$ and $T_8$. Switch $S_7$ is closed relative to the recording or R contacts thereby connecting recording head 110 to the output of amplifier $A_3$ whereby the indexing recorder is in readiness to index the energizing signals for the transmitter motor windings. The closure of switch $S_8$ applies the alternating-current output of the power source to indexing recorder drive motor 107. Rheostat 108 controls the amplitude of the potential applied to motor 107. Command transmitters $T_1$ and $T_2$ are adjusted relative to their respective channel belts $B_1$ and $B_2$ by operation of hand cranks $O_1$ and $O_2$, whereby the desired command signals can be transmitted by closure of switch $S_1$—$S_2$ to transmitters $T_7$ and $T_8$ of the stationary recorder. The recording operation transfers the pulse spacing of the segments of channel belts $B_1$ and $B_2$ under the pickup heads of transmitters $T_1$ and $T_2$ to the portion of the magnetic tape 101 located under oscillating recording heads $T_7$ and $T_8$. Longitudinal carriage $C_1$ and transverse carriage $C_2$ move to their commanded positions by the same servo action described previously with respect to the system of Figure 12. With this recording operation, magnetic tape 101 is advanced a fixed distance to a new recording position by circuit operation hereinafter described in detail. This distance is generally greater than that of the oscillation arc of the recording heads for transmitters $T_6$, $T_7$ and $T_8$ and is of the order of .25 inch. A second set of command signals is recorded in the same manner utilized to record the first set of command signals. By process of continued recording, the controlled carriages $C_1$ and $C_2$ are moved through a desired program of positions with recordings being made by transmitters $T_7$ and $T_8$ of the command signals for each such position.

During the playback phase, switch $S_5$ is opened and switch $S_7$ is thrown to the play-back or P position. Switch $S_1$—$S_2$ is left open inasmuch as the command signals are received from the stationary recorder and not from command transmitters $T_1$ and $T_2$. The resulting servo action is as previously described with the intermittent drive of the stationary recorder advancing tape 101 to the next recorded station and new "play-back" signals moving controlled carriages $C_1$ and $C_2$ to new positions defined by the magnetic command records of tape 101. The stationary recorder tape drive which will be described immediately hereinafter successively advances tape 101 to each stop or position of an indexing program.

The feed for tape 101 of the stationary recorder is accomplished by controlling the rotary motion of driving drum 102. Any of many known means for advancing this drum through a fixed angle and holding the drum for a controllable length of time at each stop can be used to provide the requisite intermittent drive for drum 102 and the feed of tape 101. Basically, the same principle of operation that is used to control the motion of carriages $C_1$ and $C_2$ also controls the indexing or intermittent motion for drum 102. Transmitter $T_6$ is associated with a magnetic channel located on tape 101 which is a permanently recorded signal identical in character with that of channels $CH_1$ and $CH_2$ for the longitudinal and transverse carriages. Indexing command transmitter $T_5$ associated with channel belt $B_3$ generates indexing command signals which are compared by error-measurement discriminator $D_3$ with the position signals generated by position transmitter $T_6$. The error output signal for discriminator $D_3$ is amplified by amplifier $A_4$ and thereafter energizes motor 103 which drives drum 102. By turning handle $O_3$ which controls channel belt $B_3$ for the indexing command transmitter, the channel is advanced a fixed distance, usually a distance equal to the arc of transmitter $T_5$, whereby the feed command signal for the indexing command transmitter provides the feed or intermittent drive for the stationary recorder.

During the recording phase, switch $S_6$ is closed and the indexing command signals are recorded on tape 104 of the indexing recorder. The index recorder is a continuous recorder, and during the play-back phase switch $S_6$ is opened and the recorded indexing command signals are detected by pickup head 109 and are supplied to error-measurement discriminator $D_3$ in lieu of the indexing signals of the indexing command transmitter.

The time duration between feeds is determined by the speed of the tape for the indexing recorder. As previously noted, the speed of this tape is controlled by the setting of rheostat 108 which in turn controls the speed of drive motor 107. In summary, the continuous indexing recorder controls the speed of the indexing of the stationary recorder which in turn controls the motions and positions of carriages $C_1$ and $C_2$.

It should be noted that a "master" indexing recorder having additional channels could control a large number of stationary recorders instead of the one stationary recorder shown in the illustrative embodiment of Figure 13. For example, if the indexing recorder had 31 channels, the indexing of 30 stationary recorders could be obtained. If each stationary recorder had 30 recording channels, then the record of the master indexing recorder could control the positions of 900 elements. The length of the program for the number of successive positions of each program element is controlled by the length of the recording tape. For example, if the stationary recorder used a 10-foot long endless tape, the number of stations or stops which could be recorded would be approximately 480. The "master" indexing recorder could then command a total of 480 times 900 or 432,000 positions.

The iconoscope transmitter diagrammatically shown in Figures 14, 15 and 16 comprises two principal components, iconoscope 110 and density channel 111. Density channel 111 is formed with sinusoidal black and white color impressions uniformly varying in frequency throughout the channel length. Light source 114 illuminates the channel so that it can be projected.

When density channel 111 is moved relative to lens 112 of the iconoscope, images of the viewed channel sections are projected on mosaic 113. The mosaic image is scanned by electron beam 115 longitudinally or in a plane parallel to the channel. Only a single set of deflection plates 116 is required for this one axis scanning. Electron gun 117 produces the requisite electron beam. The fact that the image of the channel is long and narrow makes it possible for the mosaic to be long and narrow, and also to place electron gun 117 close to lens 112 with only a small angle between the planes of the light rays and the electron beam.

The modulated electrical current generated by scanning mosaic 113 produces an alternating-current potential having a frequency which defines the relative positions of iconoscope 110 and channel 111. This alternating-current potential appears between electrodes 118 and mosaic 113. This modulated potential is amplified when applied to a programming system. Additional operative details concerning iconoscope 110 and electron gun 117 are not set forth herein because these structures are old and well known in the art.

The waveform characteristics of the iconoscope output are similar to the waveform characteristics of the oscillating magnetic transmitter, with the exception that there is no amplitude modulation. The sweep cycle of the beam is similar to the oscillation cycle of the magnetic transmitter, and it comprises the sweep of the beam over mosaic 113 in one direction and return. The frequency varies from zero at one extreme of the sweep to maximum frequency at the center of the sweep and then returns to zero frequency at the other extreme of the sweep. The second half of the cycle is identical to the first half but in the reverse order.

As in the oscillating magnetic transmitter there are two types of modulation, a constant modulation of frequency due to the sweep cycle, and a modulation or adjustment due to the adjustment of the relative position of the iconoscope and the channel. The modulation caused by the sweep cycle is identical in all three types of iconoscope transmitters regardless of whether they are used for command, position or reference transmitting. In all three cases the operative function of the iconoscope and its associated channel is the same. As in the programming system using the magnetic oscillating transmitters, the modulation caused by the sweep cycle cancels out in the discriminator action.

Assuming that the following is true for both command and position iconoscope transmitters: (1) Sweep lengths are equal. (2) The beams sweep in the same direction; that is, they both increase frequency and decrease frequency on their respective channels at the same time. (3) The strength, length and frequency ranges of the sinusoidal black and white color density channels are equal. (4) The transmitters are held at dissimilar positions on the channel. Then, at any instant during the sweep cycle there is a constant difference in the frequencies of the output signals for the two transmitters.

When beat reception is used as the means of determining the difference or error in the servo systems using iconoscope transmitters, the error measurement discriminator shown in Figure 7 can be utilized. However, when an iconoscope programming system such as that shown in Figure 17, which corresponds to the system of Figure 8 employing magnetic transmitters, uses a direct-current discriminator, there must be a slightly different arrangement due to the fact that the magnetic transmitter produces an amplitude modulated output signal while the iconoscope transmitter does not. In Figure 6, discriminator action depends on the amplitude of the voltage even though the frequency is proportional to the voltage in the reproduction of a recorded magnetic signal. In the iconoscope transmitter there is no correlation between the frequency and the voltage so that the discriminator used should employ inductors to provide this correlation.

It is to be understood that the above-described arrangements are illustrative of the applications of the principles of this invention. Numerous other arrangements may be devised by those skilled in the art to which this inven-

Having thus described the invention, what is claimed as new and desired to be secured by Letters Patent is:

1. A programming control system, comprising an oscillating command transmitter, a movable magnetic channel magnetically coupled to said command transmitter whereby the output signal of said transmitter uniquely defines the relative position of said transmitter with respect to said channel, a load whose movements are to be controlled by the command transmitter, a second magnetic channel mechanically coupled to said load, an oscillating position transmitter magnetically coupled to said second channel whereby the output signal of said transmitter uniquely defines the relative position of said load with respect to said position transmitter, a motor for driving said load to a commanded position, and a discriminator connected to said control and position transmitter and said motor whereby the discriminator output energizes said motor so that load is driven to the command position.

2. The combination of claim 1 wherein said discriminator adds in opposition the output signals of said command and position transmitters and produces a direct-current discriminator output signal whose polarity and magnitude is a measure of the direction and magnitude of the difference in the positions of the two transmitters relative to their associated channels.

3. The combination of claim 1 wherein said discriminator beats the output signals of said command and position transmitters and supplies to said motor an output signal whose frequency and amplitude is a measure of the direction and magnitude of the difference in the positions of the two transmitters relative to their associated channels.

4. The combination of claim 1 including a continuous recorder having a first recording playback head for recording the command signals generated by said command transmitter and a second recording playback head for recording the oscillation producing currents for said command and position transmitters, means for connecting said first recording head to said discriminator to the exclusion of said command transmitter on recorder playback and means for connecting said second recording head to the command and position transmitters on recorder playback whereby synchronization between the position transmitter and the recorded command signals is attained during recorded programming.

5. The combination of claim 1 including a stationary recorder having a recording-playback oscillating transmitter and a position indexing oscillating transmitter, said indexing transmitter being associated with a magnetic channel which corresponds with that of the position transmitter, an indexing command transmitter and an associated indexing command channel, an indexing recorder having a first recording-playback head for recording the indexing command signals transmitted by said indexing command transmitter and a second recording-playback head for recording the oscillating producing currents for said command, position, recording-playback, and position indexing transmitters, means for connecting said recording-playback oscillating transmitter to said discriminator to the exclusion of said command transmitter on playback of the stationary recorder, a second discriminator for connecting said position indexing transmitter and said recording-playback head for recording indexing command signals to said second discriminator, and means for connecting said second recording-playback head to the oscillation means for the transmitters on playback.

6. A programming control system, comprising an oscillating command transmitter, a movable magnetic channel magnetically coupled to said command transmitter whereby the output signal of said transmitter uniquely defines the relative position of said transmitter with respect to said channel, a load whose movements are to be controlled by the command transmitter, a second magnetic channel mechanically coupled to said load, an oscillating position transmitter magnetically coupled to said second channel whereby the output signal of said transmitter uniquely defines the relative position of said load with respect to said position transmitter, a motor for driving said load to a commanded position, a discriminator interconnecting said control and position transmitters and said motor whereby the discriminator output energizes said motor so that the load is driven to the command position in a first mode of operation, a stationary recorder having a recording-playback oscillating transmitter for recording position command signals generated by the command transmitter, intermittent feed means for the stationary recorder, means for connecting said recording-playback oscillating transmitter to the command transmitter during recording, and means for connecting the recording-playback oscillating transmitter to the discriminator to the exclusion of the command transmitter during playback whereby the positioning of said load is controlled by the stationary recorder in a second mode of operation.

7. A programming control system, comprising a direct-current numerical transmitter for generating command signals, a load whose movements are to be controlled by the direct-current numerical transmitter, a magnetic channel mechanically coupled to said load, an oscillating position transmitter magnetically coupled to said channel, a position-reference transmitter and associated magnetic channel, a discriminator interconnecting said position transmitter and said position-reference transmitter, a motor for driving said load to the commanded position, and means for adding in opposition the direct current outputs of said direct-current numerical transmitter and said discriminator thereby producing an error signal for energizing said motor.

8. A programming control system, comprising a frequency numerical transmitter for generating command signals, a load whose movements are to be controlled by the frequency numerical transmitter, a magnetic channel mechanically coupled to said load, an oscillating position transmitter magnetically coupled to said channel, a position reference transmitter and associated magnetic channel, a beat reception discriminator interconnecting said position transmitter and said position-reference transmitter, a motor for driving said load to the commanded position and a direct-current discriminator connected to the outputs of said frequency numerical transmitter and said beat reception discriminator thereby producing an error signal for energizing said motor and driving the load to the commanded position.

References Cited in the file of this patent

UNITED STATES PATENTS

| | | |
|---|---|---|
| 2,295,000 | Morse | Sept. 8, 1942 |
| 2,475,245 | Leaver et al. | July 5, 1949 |
| 2,579,831 | Keinath | Dec. 25, 1951 |
| 2,658,950 | Canfora | Nov. 10, 1953 |
| 2,668,283 | Mullin | Feb. 2, 1954 |
| 2,672,944 | Minton | Mar. 23, 1954 |

FOREIGN PATENTS

| | | |
|---|---|---|
| 649,195 | Great Britain | Jan. 24, 1951 |